Patented July 8, 1952

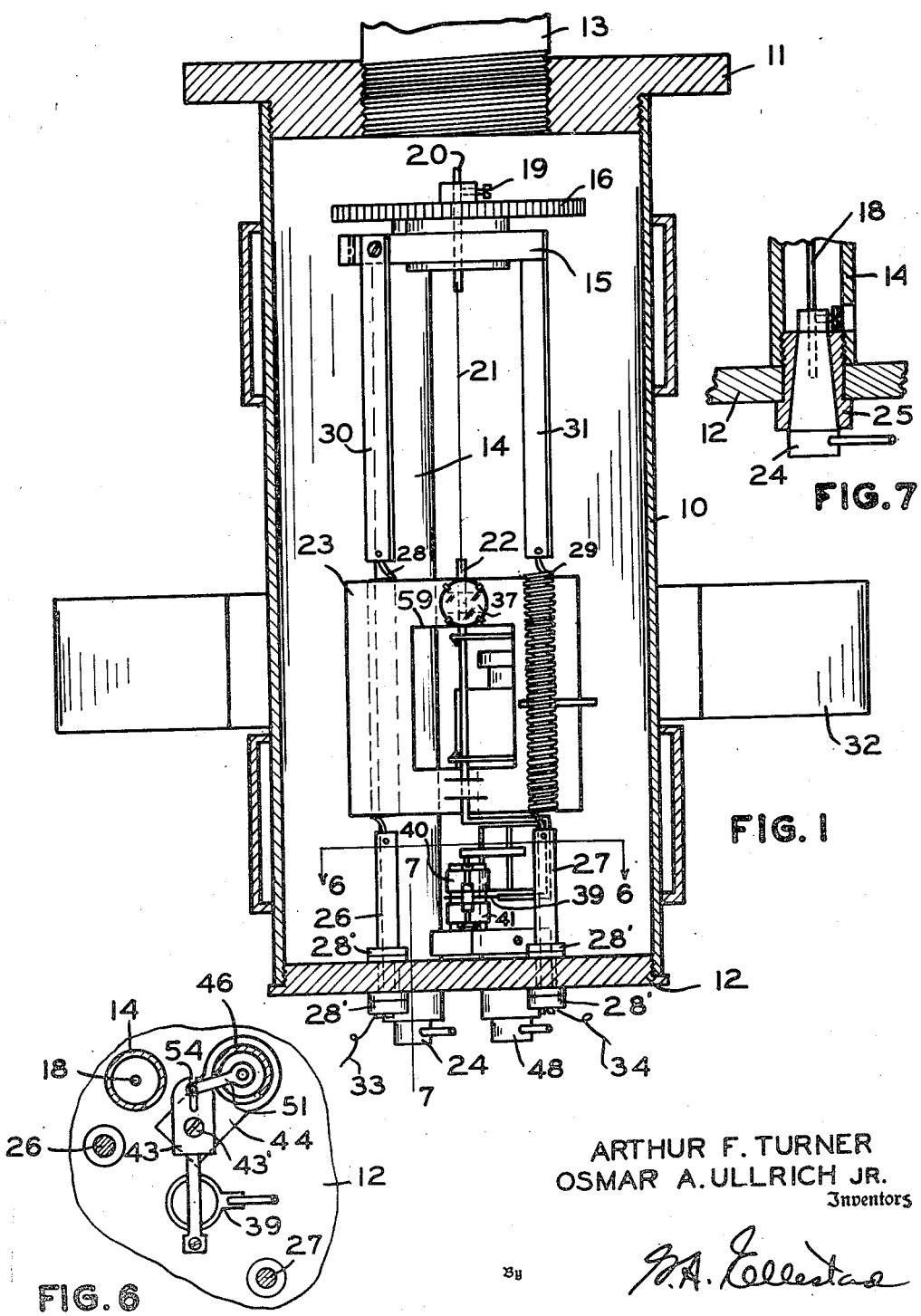

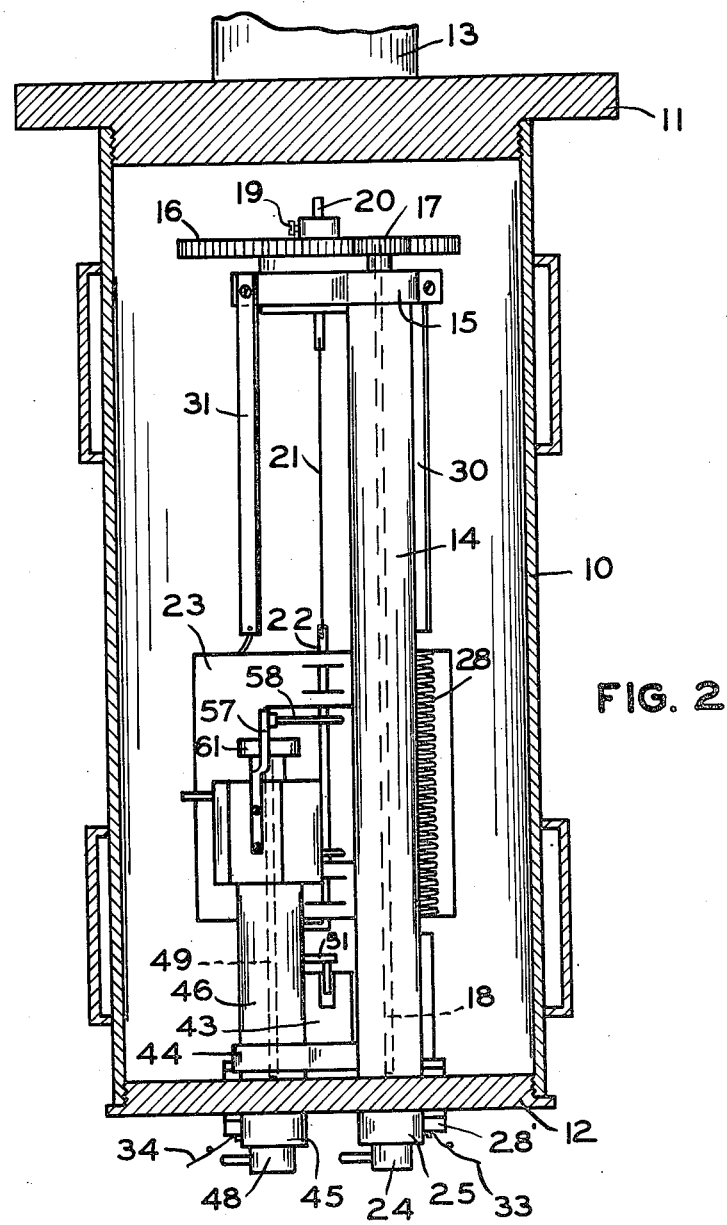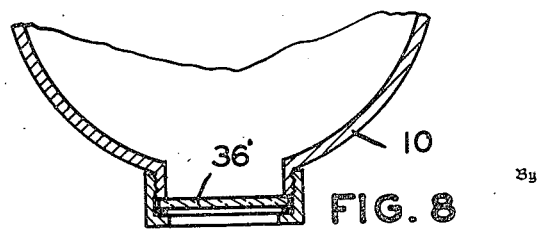

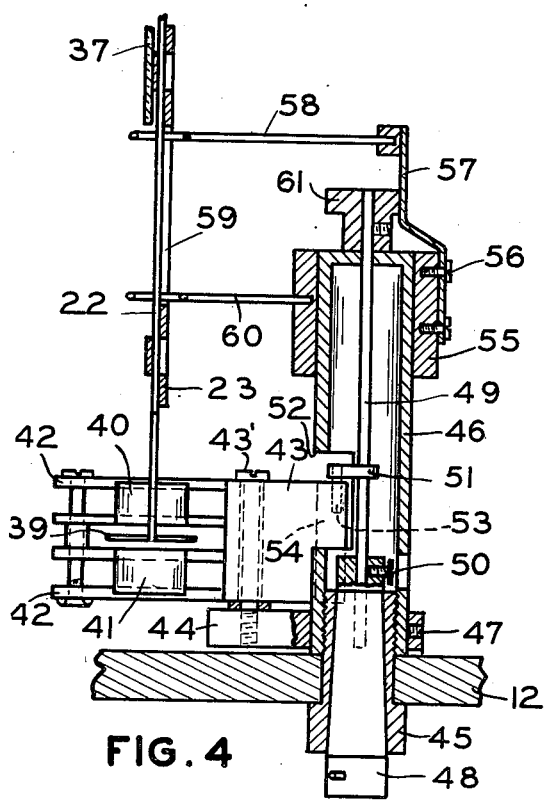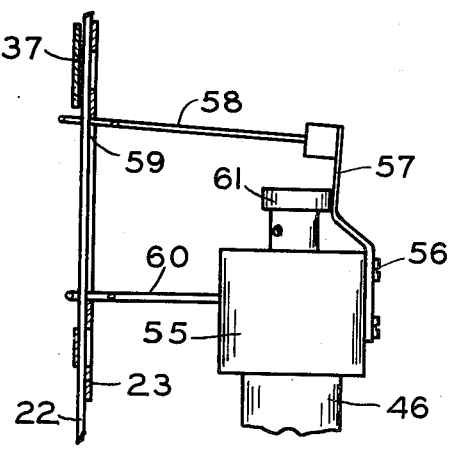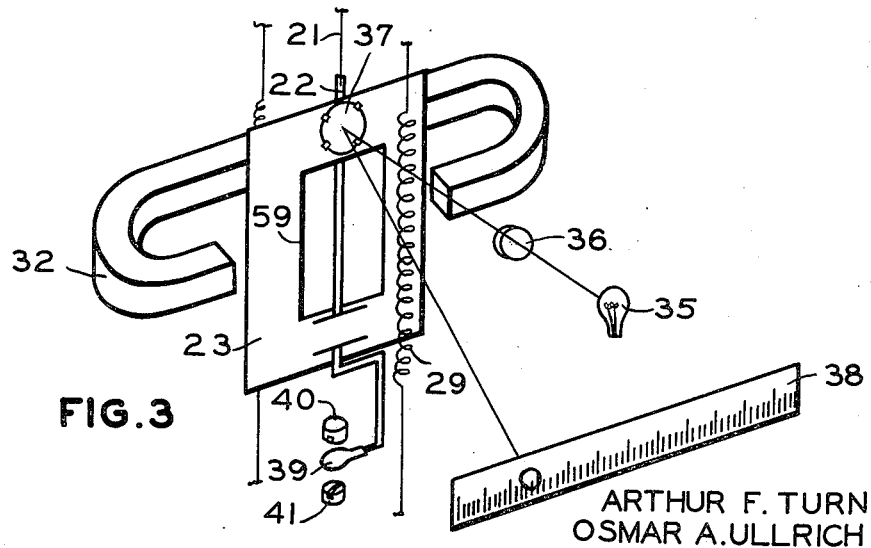

2,602,332

UNITED STATES PATENT OFFICE 2,602,332

DAMPING AND ARRESTING MEANS FOR SUSPENSION SYSTEMS

Arthur F. Turner, Brighton, and Osmar A. Ullrich, Jr., Gates, N. Y., assignors to Bausch & Lomb Optical Company, Rochester, N. Y., a corporation of New York Application July 14, 1945, Serial No. 605,012

3 Claims. (Cl. 73—430)

This invention relates to instruments embodying suspension systems and more particularly it has reference to means for damping and/or arresting the movements of suspension systems.

Certain types of relative delicate measuring instruments embody a member such as a light vane which is suspended from a support by a filament suspension so that it may turn against the resistance of the filament when acted upon by forces which are related to the quantities to be measured. Since the vane is suspended by a flexible suspension filament, it will also be free to swing like a pendulum from the support. Such pendulous movements of the vane, whether produced by accidental jarring or other vibrations, will interfere with the functioning of the instrument since the vane of such an instrument usually carries a small reflector which directs a beam of light and cross hair image onto a suitable scale. The undesired pendulous movements of the vane may, therefore, cause the cross hair image on the scale to oscillate erratically and prevent an accurate reading of the instrument.

One of the objects of our invention is to provide means for damping the pendulous movements of an instrument suspension device. Another object is to provide magnetic means for damping pendulous movements of a member which is carried by a flexible suspension device. A further object is to provide in an instrument of the type described means for arresting and holding the suspended member so as to relieve the suspension device from supporting the member. These and other objects and advantages reside in certain novel features of construction, arrangement, and combination of parts as will hereinafter be more fully described and pointed out in the appended claims.

Referring to the drawings:

Fig. 1 is a front view of an instrument embodying our invention, with parts shown in section.

Fig. 2 is a rear view thereof with parts in section.

Fig. 3 is a schematic view showing the operation of our damping device.

Fig. 4 is a fragmentary view, with parts in section, showing the mechanism for lifting the vane and moving the magnets.

Fig. 5 is a detail showing the relation of the parts when the vane has been lifted.

Fig. 6 is a fragmentary view taken on line 6—6 of Fig. 1.

Fig. 7 is a sectional view taken on line 7—7 of Fig. 1.

Fig. 8 is a fragmentary horizontal sectional view showing the window in the casing.

A preferred embodiment of our invention is shown on the drawings as applied to a high vacuum gauge of the Knudsen type. The general theory and construction of this gauge are described, for instance, by DuMond and Pickels in vol. 6, Review of Scientific Instruments 1935, pages 362–370. It is to be understood that our novel damping and vane arresting devices may be applied to other types of instruments embodying suspension devices. Our novel damping and vane arresting devices are shown, on the drawings, as applied to a well-known type of vacuum gauge comprising a cylindrical casing 10 which is closed, respectively, at its upper and lower ends by threaded caps 11 and 12. Threaded into the upper cap 11 is a conduit 13 which connects the gauge to the vacuum system whose pressure is to be measured.

Fixedly mounted on cap 12 is a tube 14 which supports at its upper end a plate 15. Rotatably mounted on plate 15 is a gear wheel 16 which is in operative engagement with a pinion 17 carried at the upper end of shaft 18 which extends upwardly through the cap 12 and within the tube 14. Secured within an axial opening in gear wheel 16 by means of screw 19 is the downwardly projecting rod 20. To the lower end of the rod 20 is fixedly secured the suspension filament 21 which may be formed of any suitable material such as a tungsten wire having a diameter of the order of 0.0006 inch. The lower end of the filament 21 is secured to a thin metal strip 22 which is centrally secured to a flat rectangular vane 23 formed of light material, such as thin aluminum sheeting. It will be seen that the vane 23 is thereby freely suspended from the lower end of the rod 20 by means of the flexible filament 21. The lower end of shaft 18 is secured to a tapered plug 24 which is rotatably mounted with a vacuum-tight joint in the bushing 25 extending through an opening in the cap 12. It will be apparent, therefore, that the vane 23 may be rotatably adjusted by turning the plug 24 beneath the gauge.

Fixedly mounted to the lower cap 12 are the spaced metal members 26 and 27 which are insulated from the cap 12 by suitable insulation bushings 28'. Secured, respectively, at the upper ends of the members 26 and 27 are the heating coils 28 and 29 whose upper ends are attached, respectively, to metal strips 30 and 31 which are secured at their upper ends to metal plate 15. Electrical current from a suitable source is supplied to heat the coils by means of the lead-in wires 33 and 34. When the heating coils are energized, the gas molecules in the neighborhood of the coils become heated and the total force produced by the impact of these molecules on the light aluminum vane 23 varies with the pressure in the gauge. Accordingly, the impact of the gas molecules on the portions of the vane facing the coils will cause the vane 23 to turn about the vertical axis of the filament 21, and the amount of movement of the vane 23 will, therefore, give an indication of the pressure within the gauge. In order to damp the turning movement of the vane 23, the Knudsen gauge is customarily supplied with suitable magnetic damping means such as the permanent magnet 32. In order to measure the turning movements of the vane 23, light rays from a suitable source 35 are focused by means of lens 36, through a window 36' mounted in the front of the casing 10, onto a small reflector 37 secured to the upper part of the front face of vane 23 and thence onto a suitable scale 38. Such an arrangement is shown schematically in Fig. 3.

Since the vane 23 is supported by the flexible filament suspension 21, the vane 23 will not only be capable of turning about the vertical axis of the filament 21 but it will also be subject to pendulous movement which may be caused by accidentally jarring the instrument or by vibrations otherwise produced. Such pendulous movements of the vane are highly undesirable because they can give rise to a complicated motion of the vane to such an extent that the reflected beam of light moves erratically on the scale making an accurate reading of the cross hair position impossible. Such conditions would, therefore, render the gauge inoperative. Although this type of vacuum gauge has been known for many years, it has heretofore been regarded as a relatively delicate instrument which has been reserved for use in the laboratory under ideal conditions of freedom from vibration. We have found that the principle reason for this lies in the fact that the horizontal magnetic field, as heretofore utilized, is incapable of damping the undesired pendulous motions of the vane. By means of our novel damping device, we have greatly reduced the undesired pendulous movements of suspension systems, such as found in the Knudsen vacuum gauge, and have thereby rendered such delicate instruments useful under conditions wherein they would be subject to accidental jarring or vibration.

For damping the undesired pendulous movements of suspension systems, we mount on and below the vane a substantially horizontal light metal plate which is adapted to cut the lines of force in a magnetic field produced by two opposed, vertically spaced, permanent magnets. In the embodiment shown on the drawings, a thin copper plate 39 is mounted to project laterally from the lower end of the offset portion of metal strip 22 which is secured to and extends below the vane 23. The plate 39 is positioned so that the vertical axis of the filament 21, which is substantially coincident with the axis of vane 23, intersects the central portion of the plate. A pair of permanent magnets 40 and 41 are mounted respectively, in opposed relation, above and below the metal plate 39. The magnets are supported by arms 42 secured to block 43 which is mounted to swing laterally about the pivot formed by screw 43' threaded into block 44. We prefer to mount magnets 40 and 41 relatively close to each other so as to produce a sufficiently strong magnetic damping field. A bushing 45, extending through an opening in the bottom of cap 12, is threaded to a short vertical tube 46 which fixedly supports the block 44 by means of set screw 47. Rotatably mounted, with a vacuum-tight joint, in the bushing 45 is a tapered plug 48 to which is secured the upwardly extending shaft 49 by means of set screw 50. Secured to shaft 49 is an arm 51, projecting through an opening 52 formed in tube 46, and having a pin 53 which extends into a slot 54 formed in block 43.

The upper end of tube 46 fixedly carries a bushing 55 to which is secured by screws 56 an upwardly extending, offset metal spring member 57. Secured to the upper end of spring 57 and extending laterally therefrom is a relatively rigid arm 58 which extends through a central opening 59 formed in vane 23 and has its free end formed to encircle, but not touch, the metal strip 22. A second relatively rigid arm 60 extends laterally from bushing 55 through the opening 59 in vane 23 with its free end also encircling the metal strip 22. The upper end of shaft 49 projects beyond the tube 46 and fixedly carries a cam member 61. When the cam member is in the position shown in Fig. 4, the arms 58 and 60 are out of engagement with the vane 23 so that the latter is free to move. When it is desired to arrest the movement of the vane 23 so as to relieve the filament 21 from carrying the weight of the vane, the cam 61 is turned, by means of the plug 48 beneath the gauge, to the position indicated in Fig. 5. In this position the cam 61 urges the spring member 57 outwardly and thereby raises the arm 58 so as to lift the vane and thereby bring the two arms into firm engagement with the upper and lower edges of the opening 59 formed in vane 23. Since such upward movement of the vane 23 carries the plate 39 upwardly, it is necessary to swing the magnets laterally so they will not interfere as the plate 39 is moved upwardly when the vane is arrested. It will be apparent from the foregoing description that the magnets 40 and 41 are swung laterally just before the arms 58 and 60 are brought into engagement with the vane since both the movements are actuated by the same shaft 49. It is possible, therefore, to free the suspension system entirely from the damping action of magnets 40 and 41 for making other types of measurements. Accordingly, we prefer to mount both upper and lower magnets for lateral swinging movement although only the upper magnet 40 need be swung laterally in order to permit the plate 39 to move upwardly when arresting the motion of the vane.

From the foregoing, it will be apparent that we have attained the objects of our invention and provided a simple, yet efficient means, for damping the pendulous movements of a suspension system which is adapted to turn about a substantially vertical axis in accordance with forces related to the quantity to be measured. We have also provided improved means for arresting all movements of the suspension system in order to relieve the filament from carrying the weight of the system. It is generally desirable to arrest the system when moving the instrument since otherwise the delicate filament might be broken accidentally. While we have shown our inventions as applied to a certain well-known type of vacuum gauge, it is, of course, obvious that our inventions could be equally well applied to other types of instruments which embody suspension systems which are subject to vibrations which would otherwise prevent proper functioning of the instrument. This will make it possible to adapt such instruments for general and more widespread use so that delicate instruments, which have hitherto been reserved for laboratory use, may now be used with all their advantages under different circumstances. Various modifications may obviously be made without departing from the spirit of our invention as pointed out in the appended claims.

We claim:

1. In a device of the type described, the combination of a vane having an opening therein, a support, a suspension filament for suspending the vane from the support, whereby the vane is freely mounted for movement, means for lifting the vane so as to relieve the filament from supporting the vane, said means comprising a pair of spaced fingers extending within the opening in the vane, one of said fingers being selectively movable into engagement with the side of the opening whereby to lift the vane and be firmly engaged by the two fingers.

2. In a device of the type described, the combination of a vane, a support, a flexible filament suspension for suspending the vane from the support whereby the vane may swing from the support, means for damping the swinging movement of the vane, said means comprising a substantially horizontal metal plate secured to and positioned below said vane, a pair of vertically spaced magnets positioned, respectively, on opposite sides of the plate, means for selectively swinging at least the upper magnet laterally of the plate and means for arresting and holding the vane so as to relieve the filament from supporting the vane.

3. In a device of the type described, the combination of a casing, a support within the casing, a vane, a filament suspension for suspending the vane from the support whereby the vane may swing from the support, means for damping the swinging movement of the vane, said means comprising a substantially horizontal metal plate supported by and below the vane, and a pair of magnets mounted, respectively, in opposed relation above and below the plate, said magnets being pivotally mounted for lateral movement away from the plate, means for selectively lifting the vane to relieve the filament from supporting the vane and means operable exteriorly of the casing for simultaneously moving the magnets laterally and lifting the vane whereby the latter is supported by means other than the filament suspension.

ARTHUR F. TURNER.
OSMAR A. ULLRICH, JR.

REFERENCES CITED

The following references are of record in the file of this patent:

UNITED STATES PATENTS

| Number | Name | Date |
| --- | --- | --- |
| 590,653 | Thomson | Sept. 28, 1897 |
| 1,126,233 | Langmuir | Jan. 26, 1915 |
| 1,263,393 | Ellis | Apr. 23, 1918 |
| 1,684,229 | Koenigsberger | Sept. 11, 1928 |
| 1,997,636 | Gattoni | Apr. 16, 1935 |
| 2,353,617 | Lamb | July 11, 1944 |

FOREIGN PATENTS

| Number | Country | Date |
| --- | --- | --- |
| 648,380 | Germany | Aug. 2, 1937 |
| 243,387 | Great Britain | July 15, 1926 |